United States Patent [19]

Larson

[11] Patent Number: 4,604,969

[45] Date of Patent: Aug. 12, 1986

[54] MILKING INFLATION INCLUDING AIR VENT

[76] Inventor: Leigh R. Larson, 100 Lincoln St., Johnson Creek, Wis. 53038

[21] Appl. No.: 745,201

[22] Filed: Jun. 17, 1985

[51] Int. Cl.⁴ .............................................. A01J 5/04
[52] U.S. Cl. ............................... 119/14.36; 119/14.49
[58] Field of Search ............... 119/14.36, 14.47, 14.48, 119/14.49, 14.50, 14.51, 14.52

[56] References Cited

U.S. PATENT DOCUMENTS 3,659,558  5/1972  Noorlander ................... 119/14.36 X
4,303,038  12/1981  Thompson et al. ............. 119/14.36

Primary Examiner—Hugh R. Chamblee
Attorney, Agent, or Firm—Glen A. Buse

[57] ABSTRACT

The milking inflation is formed from an elastomeric material and includes a suction sleeve which is located inside the shell of a teat cup assembly and a milking tube portion which is located below the lower end of the shell. An air vent is formed as an integral part of the milking tube portion at a location near the lower end of the shell. The air vent includes an annular recess in the wall of the milking tube portion which defines an isolated area and includes a bottom having an annular web section of reduced thickness surrounding the isolated area and also an opening extending through the isolated area for admitting a metered amount of air into the milking tube portion. The thinner, more flexible web section absorbs distortions caused by flexing of the milking tube portion during the milking operation, so that the air vent opening substantially retains its original shape and size during use.

11 Claims, 6 Drawing Figures

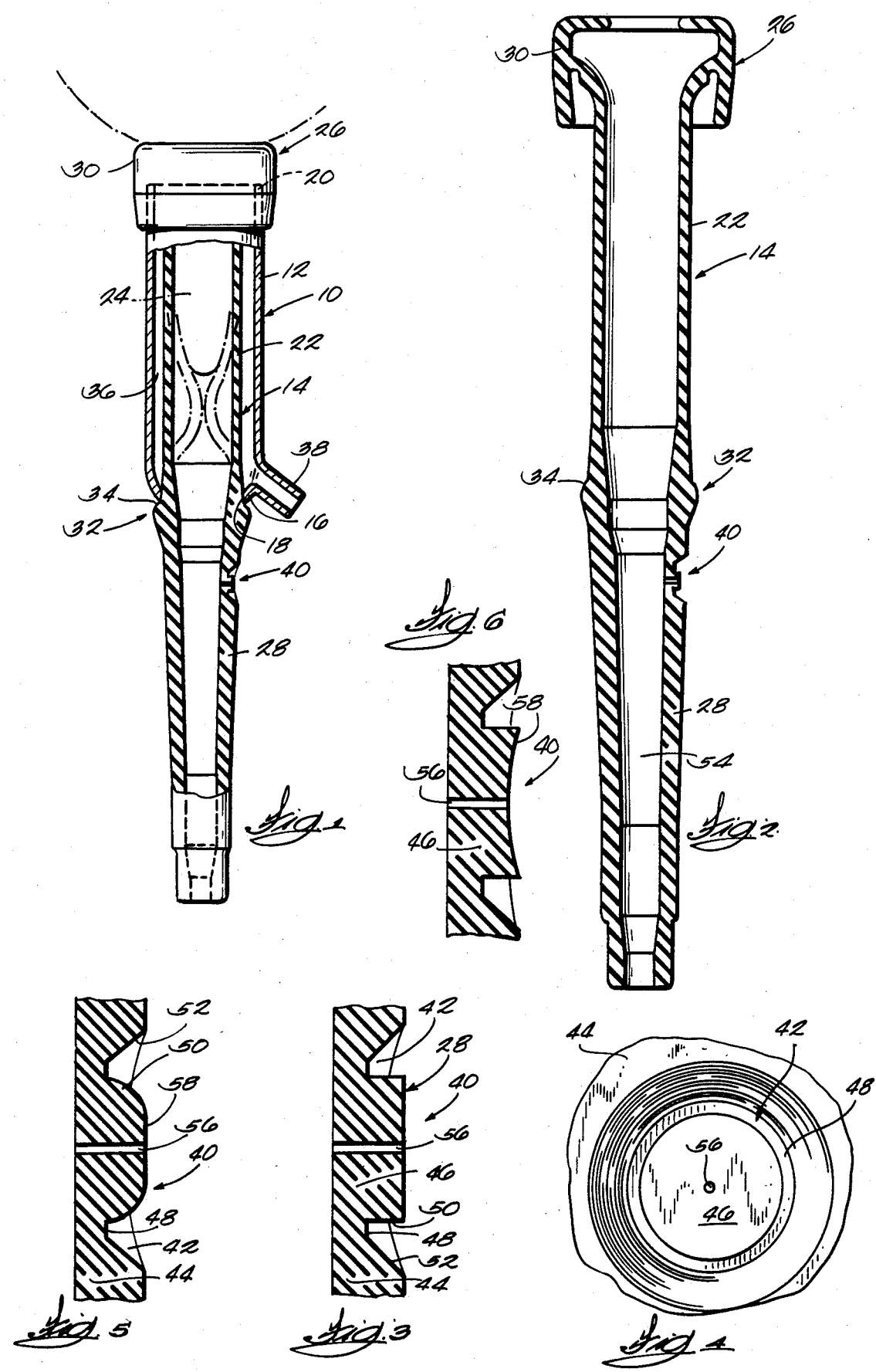

MILKING INFLATION INCLUDING AIR VENT

BACKGROUND OF THE INVENTION

This invention relates to liners or inflations for teat cup assemblies of vacuum-operated milking machines and, more particularly, to such inflations including an air vent.

Automatic milking machines employ teat cup assemblies having a hollow, rigid outer shell and a resilient, tubular liner or inflation installed in the shell in a manner to form a seal at both ends of the shell and define a chamber between the shell and the inflation. A cow's teat is inserted into the upper end of the inflation and the lower end is connected to a so-called claw of the milking machine. During the milking operation, the teat cup assembly is suspended from a cow's teat, primarily by the engagement between an opening or mouth in the upper or head end of the inflation. A vacuum maintained in the milking machine claw causes the teat opening to dilate, allowing milk to flow from the teat and through the inflation.

The chamber between the shell and inflation is connected to a pulsator on the milking machine. The pulsator periodically opens this chamber to atmospheric pressure, causing a portion of the inflation inside the shell to collapse. This isolates the teat from the vacuum applied through the milking machine claw and interrupts the flow of milk from the teat to effect a resting period required in order to avoid injury to the teat. Flow of milk from the teat resumes when the pulsator subsequently evacuates the chamber between the shell and the inflation.

The periodic changes in the internal volume of the inflation caused by this collapsing and distention of the inflation walls produces pressure surges which tend to slow the rate at which milk can be drawn through the lower portion of the inflation. These pressure surges can cause the inflation to become flooded with milk, in which event air and/or milk may be forced backward through the teat opening. Such a condition can cause mastitis.

A recent practice has been to administer hormones to milk cows to increase milk production which results in an increase in milk flow. This practice increases the need for means to promote milk flow through an inflation.

Attempts have been made to minimize this problem by proving a relief or vent opening in the milking machine claw or in the walls of the inflation. The first approach only partially solves the problem because air is admitted below the inflation and a column of milk still can form inside the inflation. The second approach does not work satisfactorily because flexing of the flexible walls of the inflation can distort the shape and/or size of the vent hole and thereby change its effective flow area. Consequently, such holes do not admit a uniform amount of air. The admission of too little air does not eliminate the undesired pressure surges and admission of too much air can cause foaming and other undesirable conditions.

Noorlander U.S. Pat. No. 3,476,085, issued Nov. 4, 1969, discloses that the above shortcomings can be obviated by inserting a rigid plug including a calibrated port in a larger hole in the milking tube portion of the inflation. Such an arrangement requires a separate part which must be installed into the inflation. Also, although designed to resist withdrawl from the hole in the inflation walls, these inserts can be intentionally or accidentally removed, in which case the hole in the inflation will always be much larger than desired.

SUMMARY OF THE INVENTION

One of the objects of the invention is to provide a resilient milking inflation having an air vent opening formed integrally in the wall of the inflation.

Another object of the invention is to provide such a milking inflation which is arranged so that the air vent opening substantially retains its original size and shape during use.

Other objects, aspects and advantages of the invention will become apparent to those skilled in the art upon reviewing the following detailed description, the drawing, and the appended claims.

The invention provides a milking inflation made from an elastomeric material and having an upper portion located inside the shell of a teat cup assembly and an elongated milking tube portion extending below the shell. The milking tube portion includes an annular recess located near the lower end of the shell defining an isolated area and including a bottom portion having an annular web section of reduced thickness surrounding the isolated area and further includes an opening extending through the isolated area for admitting a metered amount of air into the milking tube portion. The thinner, more flexible web section, which preferably has a wall thickness no more than about 45% of the wall thickness of the milking tube portion in the contiguous region, isolates the opening from distortions caused by flexing of the milking tube portion during the milking operation.

In one embodiment, a first wall of the recess extends radially outwardly from the web section and forms a periphery of the isolated area and a second wall of the recess is spaced from the first wall and extends radially outwardly from the web section at an incline in a direction away from the first wall.

In one embodiment, the first wall of the recess extends generally perpendicularly to the longitudinal axis of the milking tube portion.

In one embodiment, the first wall of the recess is upwardly inclined in a direction away from the second wall.

BRIEF DESCRIPTION OF THE DRAWING

FIG. 1 is a broken away, partially sectioned, elevational view of a teat cup assembly including a milking inflation of the invention.

FIG. 2 is an enlarged, sectioned elevational view of the milking inflation.

FIG. 3 is an enlarged fragmentary view of the portion of the milking inflation including an integral air vent.

FIG. 4 is a fragmentary plan view of the air vent illustrated in FIG. 3.

FIG. 5 is a view similar to FIG. 3 illustrating an alternate arrangement for the air vent.

FIG. 6 is a fragmentary sectional view illustrating another alternate arrangement for the outer surface of the isolated area.

DESCRIPTION OF THE PREFERRED EMBODIMENTS

Illustrated in FIG. 1 is a teat cup assembly 10 including a rigid, generally cylindrical outer shell 12 which surrounds and supports a liner or inflation 14 which is connected to a milker claw (not shown). The milker claw is connected to a suitable vacuum system in the usual manner and has a plurality of nipples (not shown) which project upwardly and outwardly from the claw.

The shell 12 is formed from a metal, such as stainless steel, or a transparent material, such as a synthetic thermoplastic or thermosetting material. The shell 12 has a lower end 16 including an opening 18 of reduced diameter and an open upper end terminating in a rim 20.

The inflation 14 is a generally cylindrical, tubular member molded from a resilient or elastomeric material, preferably a synthetic or natural rubber composition including curing agents and the like. The inflation 14 has an elongated, generally cylindrical upper portion or suction sleeve 22 which fits inside the shell 12 and receives a cow's teat 24, a head end portion 26 which fits over the upper end of the sleeve 22 and an elongated milking tube portion 28 of reduced diameter which extends from the lower end 16 of the shell 12 and is slipped onto a milker claw nipple.

The head end portion 26 of the inflation 14 has a peripheral, downwardly extending cuff 30 which surrounds and fits snugly over the end of the shell 12 and sealingly engages the rim 20 as shown in FIG. 1.

An enlarged portion 32 is provided between the suction sleeve 22 and the milking tube portion 28. The enlarged portion 32 is squeezed through the opening 18 in the shell lower end 16 by pulling on the milking tube portion 28 after the cuff 30 is fitted into place over the shell rim 20. The enlarged portion 32 includes a flange 34 which surrounds the lower end opening 18 and forms a seal with the shell after the milking tube portion 38 is released. A sealed chamber 36 is defined between the interior wall of the shell 12 and the suction sleeve 22.

Located on the side of the shell 12 is a nipple 38 connected, via suitable tubing (not shown), in communication with a pulsator which alternately opens the chamber 36 to atmospheric pressure and evacuates the chamber 36. A vacuum is maintained in the milking claw and, thus, inside the inflation 14 after installation on a cow's teat. This causes the teat opening to dilate and milk flows from the teat 24 through the suction sleeve 22 and the milking tube portion 28 into the milker claw. The suction sleeve 22 collapses as shown by the dashed lines in FIG. 1 to interrupt milk flow when the chamber 36 is opened to atmosphere because of the differential between the pressure inside the suction sleeve 22 and the chamber 36. The suction sleeve 22 expands to permit resumption of milk flow when the chamber 36 is subsequently evacuated.

In accordance with the invention, an air vent 40 is formed as an integral part of the milking tube portion 28 at a location near the lower end 16 of the shell 12. Referring more particularly to FIGS. 3 and 4, the air vent 40 includes an annular recess 42 in a wall 44 of the milking tube portion 28 defining an isolated area 46. The bottom portion of the recess 42 includes an annular web section 48 of reduced thickness.

The recess 42 also includes a first wall 50 extending radially outwardly from the web section 48 and forming the periphery of the isolated area 46 and a second wall 52 spaced from the first wall 50 and extending radially outwardly from the section 48. The recess 42 preferably is formed into the milking tube portion 28 when the inflation 40 is molded. The second wall 52 preferably extends at an incline in a direction away from the first wall 50 to facilitate mold release and also promote drainage of any liquids which might otherwise tend to collect in the recess. In the preferred construction illustrated, the second wall 52 extends outwardly at an angle about 45° from the longitudinal axis 54 of the inflation 14.

Extending through the isolated area 46 is opening 56 for admitting a metered amount of air into the interior of the milking tube portion 28. The opening 56 preferably is centrally located in the isolated area 46 and is drilled therethrough, after the inflation 14 has been molded, with a laser or similar device capable of providing a clean opening having an uniform diameter throughout the thickness of the isolated area 46. The opening 56 usually is sized to admit between about 0.125 to about 0.5 cubic feet of air per minute. As a guide, the size of opening 56 to afford such an air flow typically is a standard drill number 60 to 80.

The thinner, more flexible web section 48 absorbs distortions, resulting from flexing of the milking tube portion 28 during the milking operation, which could change the shape and/or size of the opening 56. In other words, the web section 48 substantially isolates the isolated area 46, and thus the opening 56, from distortions which could change the effective flow area of the opening 56. To best serve this purpose, the thickness of the web section 48 preferably is no more than about 45% of the wall thickness of the milking tube portion 28 in the region contiguous to the recess 42.

While the peripheral configurations of the isolated area 46 and the web section 50 can have different shapes, both preferably are circular as illustrated in FIG. 4 to facilitate molding. As a guide, the outer diameter of the isolated area 46 can be about $\frac{3}{8}$ inch and the width of the web section 48 (i.e., distance between the walls 50 and 52) can be about 1/32 to about 1/16 inch.

The outer surface 58 of the isolated area 46 can be substantially flat as illustrated in FIGS. 3 and 4, generally convex as illustrated in FIG. 5 or generally concave as illustrated in FIG. 6. The recess first wall 50 can extend generally perpendicularly to the longitudinal axis 54 of the inflation 14 as illustrated in FIGS. 3 and 4 or extend at an incline in a direction away from the second wall 52 as illustrated in FIG. 5.

From the foregoing description, one skilled in the art can easily ascertain the essential characteristics of the invention and, without departing from the spirit and scope thereof, make various changes and modifications to adapt it to various usages.

I claim:

1. A milking inflation for a teat cup assembly including a rigid shell, said inflation being made from an elastomeric material, having an upper portion located inside the shell for receiving a cow's teat, and having an elongated milking tube portion extending below the shell, said mailing tube portion including an annular recess in the wall of said milking tube portion at a location near the lower end of the shell defining an isolated area and including a bottom portion having an annular web section of reduced thickness surrounding said isolated area; and an opening extending through said isolated area for admitting a metered amount of air into the interior said milking portion.

2. A milking inflation according to claim 1 wherein the wall thickness of said web section is not more than about 45% of the wall thickness of said milking tube portion in the region contiguous to said recess.

3. A milking inflation according to claim 1 wherein the outer surface of said isolated area is substantially flat.

4. A milking inflation according to claim 1 wherein the outer surface of said isolated area is generally convex.

5. A milking inflation according to claim 1 wherein the outer surface of said isolated area is generally concave.

6. A milking inflation according to claim 1 wherein said recess includes
- a first wall extending radially outwardly from said web section and forming the periphery of said isolated area; and
- a second wall spaced from said first wall and extending radially outwardly from said web section at an incline in a direction away from said first wall.

7. A milking inflation according to claim 6 wherein said recess first wall extends generally perpendicularly to the longitudinal axis of said milking tube portion.

8. A milking inflation according to claim 6 wherein said recess first wall is upwardly inclined in a direction away from said recess second wall.

9. A milking inflation for a teat cup assembly including a rigid shell, said inflation being made from an elastomeric material, having an upper portion located inside the shell for receiving a cow's teat, and having an elongated milking tube portion extending below the shell, said milking tube portion including
- an annular recess in the wall of said milking tube portion at a location near the lower end of the shell defining an isolated area and including a bottom portion having an annular web which surrounds said isolated portion and has the thickness no more than about 45% of the wall thickness of said milking tube portion in the region contiguous to said recess, said recess further including a first wall extending radially outwardly from said web section and forming the periphery of said isolated area and a second wall spaced from said first wall and extending radially outwardly from said web section at an incline in a direction away from said first wall; and
- an opening extending through said isolated area for admitting a metered amount of air into said milking tube portion.

10. A milking inflation according to claim 9 wherein said recess first wall extends generally perpendicularly to a longitudinal axis of said milking tube portion.

11. A milking inflation according to claim 9 wherein said recess first wall is upwardly inclined in a direction away from said recess second wall.

* * * * *

UNITED STATES PATENT AND TRADEMARK OFFICE
CERTIFICATE OF CORRECTION

PATENT NO. : 4,604,969

DATED : August 12, 1986

INVENTOR(S) : Leigh R. Larson

It is certified that error appears in the above-identified patent and that said Letters Patent is hereby corrected as shown below:

Column 1, line 49, "by proving a relief or vent opening in the milking ma-" should read ---by providing a relief or vent opening in the milking ma- ---.

Column 3, line 63, "outwardly from the section 48." should read ---outwardly from the web section 48.---

Column 4, line 56, the word "mailing" should read ---milking---.

Signed and Sealed this
Eighteenth Day of November, 1986

Attest:

DONALD J. QUIGG

*Attesting Officer*     *Commissioner of Patents and Trademarks*